US011865050B1

(12) United States Patent
Louis

(10) Patent No.: US 11,865,050 B1
(45) Date of Patent: Jan. 9, 2024

(54) FACE CRADLE COVER AND METHOD OF MAKING SAME

(71) Applicant: John G Louis, Northfield, IL (US)

(72) Inventor: John G Louis, Northfield, IL (US)

( * ) Notice: Subject to any disclaimer, the term of this patent is extended or adjusted under 35 U.S.C. 154(b) by 351 days.

(21) Appl. No.: 17/219,088

(22) Filed: Mar. 31, 2021

Related U.S. Application Data

(60) Provisional application No. 63/002,780, filed on Mar. 31, 2020.

(51) Int. Cl.
*A61G 13/12* (2006.01)
*A47G 9/02* (2006.01)
*A61H 37/00* (2006.01)
*A61G 13/00* (2006.01)

(52) U.S. Cl.
CPC ......... *A61G 13/121* (2013.01); *A61G 13/009* (2013.01); *A61H 37/00* (2013.01); *A61G 2200/325* (2013.01)

(58) Field of Classification Search
CPC ................ A61G 13/121; A61G 13/009; A61G 2200/625; A61G 2200/325; A61H 37/00; A47G 9/0253
See application file for complete search history.

(56) References Cited

U.S. PATENT DOCUMENTS

| | | | |
|---|---|---|---|
| 3,312,987 | A | 4/1967 | Emery |
| 3,667,074 | A | 6/1972 | Emery |
| 3,848,281 | A | 11/1974 | Mathews |
| 4,679,263 | A | 7/1987 | Honer |
| 4,783,866 | A | 11/1988 | Simmons et al. |
| 5,214,815 | A | 6/1993 | Agbodoe et al. |
| 5,344,437 | A | 9/1994 | Pistay |
| 6,230,349 | B1 | 5/2001 | Silver et al. |
| 6,453,493 | B1 | 9/2002 | Matthews Brown |
| 6,685,024 | B1 | 2/2004 | Matthews |
| 6,851,143 | B2 | 2/2005 | Matthews Brown |
| 7,017,212 | B2 | 3/2006 | Matthews Brown |
| 7,146,663 | B2 | 12/2006 | Brown et al. |
| 7,428,763 | B2 | 9/2008 | Hightower |
| D583,605 | S | 12/2008 | Krinsky et al. |
| 7,574,759 | B2 | 8/2009 | Wilson et al. |

(Continued)

OTHER PUBLICATIONS

John G. Louis Massage Seamless Face Rest Cradle Cover—Professional Flannel Face Pillow Covers—Machine Washable, 100% Cotton—Crescent Cover, Fits Massage Table & Chair Cushions Mar. 22, 2019, https://www.amazon.com/Seamless-Professional-Washable-Crescent-Cushions/dp/B07PYZ4XDR/ref=cm_cr_arp_d_product_top?ie=UTF8&th=1.*

*Primary Examiner* — Camtu T Nguyen
(74) *Attorney, Agent, or Firm* — John C. Shepard

(57) ABSTRACT

A face cradle cover for a massage table is a seamless, one-piece cover made from a flat cotton sheet cut to form a panel of material that is bilaterally symmetrical forming two lobes with top, bottom and intermediate portions, the top portions together spanning the head end of the cover and the bottom and intermediate portions being separated by a narrow slit and a medial opening, respectively. A narrow slit extends inward from the heel edge of the panel to the medial opening. A thin elastic strip extends around the external periphery of the panel from one side of the slit to the other side of the slit. A soft stitch or overlock serging extends internally around the medial opening from one end of the elastic strip to the other end of the elastic strip.

6 Claims, 3 Drawing Sheets

(56) References Cited

U.S. PATENT DOCUMENTS

| | | | | |
|---|---|---|---|---|
| 8,863,327 | B1 * | 10/2014 | Winn | A47G 9/007 5/490 |
| 9,867,749 | B2 | 1/2018 | Mitchell | |
| 2004/0200004 | A1 | 10/2004 | Matthews Brown et al. | |
| 2005/0210591 | A1 | 9/2005 | Mead et al. | |
| 2006/0230536 | A1 | 10/2006 | Friedman et al. | |
| 2007/0271703 | A1 | 11/2007 | Matthews Brown et al. | |
| 2009/0013471 | A1 | 1/2009 | Yang | |
| 2009/0222986 | A1 * | 9/2009 | Hamilton | A47C 31/10 5/482 |
| 2011/0247612 | A1 * | 10/2011 | DeSalvo | A61M 16/101 128/200.23 |
| 2014/0000036 | A1 | 1/2014 | Cohen | |
| 2016/0120725 | A1 * | 5/2016 | Slattery | A61G 13/121 5/622 |
| 2020/0352366 | A1 * | 11/2020 | Brooks | A61G 13/121 |
| 2021/0106784 | A1 * | 4/2021 | Haynes | A61M 21/02 |

* cited by examiner

FACE CRADLE COVER AND METHOD OF MAKING SAME

DESCRIPTION

CROSS REFERENCE TO RELATED APPLICATION

This application claims the benefit of and priority from U.S. Provisional Application Ser. No. 63/002,780 filed 31 Mar. 2020 , the disclosures of which are herein incorporated by reference in their entireties,

BACKGROUND OF THE INVENTION

Technical Field

The present invention pertains to fabric covers and, more particularly, to a cover for a face cradle or headrest that is used with a massage table or chair.

Background Art

Massage tables and chairs used by clients visiting physical therapists often have padded face cradles or headrests that support the client's head. Face cradles have leather or plastic covers and are generally crescent-shaped, U-shaped, or horseshoe-shaped with a center opening so that when the client is situated in a facedown position, the client's nose, mouth, and eyes are positioned over the opening.

Since face cradles are used by many different clients over time, to make the face cradle safe and sanitary, the face cradle must be clean. While the cradle can be sanitized after each use, it is good practice to place a new or clean cover on the cradle before each client is received. A reusable fabric cover that is washable is usually made of cotton, flannel, polyester, or micro-fiber. A disposable cover that has a one-time use is usually made or paper, crepe, fiber, or some other inexpensive material. Obviously, disposable covers are not environmentally friendly, while fabric covers can be used over and over.

A common problem with some current covers is that when placed on a cradle they may not fit properly. Either they do not completely cover the cradle surface that has been touched by a previous client or they block the opening for the client's nose.

Another problem is that some covers do not lie smoothly or flat on the cradle causing wrinkles in the fabric. As a result, the client may be uncomfortable or be left with redness, creases, or "sleep lines" impressed in his face, which may last for a long period of time.

To provide a better fit, some covers are made from multiple pieces that are sewn or otherwise fixed together to conform to the specific shape of the cradle and wrap snugly around the cradle. However, these form-fit covers have seams between the various pieces that result in raised lines that may also cause discomfort or facial lines.

BRIEF SUMMARY OF THE INVENTION

The present invention is directed to overcoming one or more of the problems as set forth above.

In one aspect of the invention, a face cradle cover is constructed so that it fits smoothly on and covers a variety of face cradles and is comfortable for a user client.

In another aspect of the invention, a face cradle cover is provided that includes an integral panel of material being centrally cut from one end so as to form two lobes of material connected by uncut material at the other end with elastic material being attached along the peripheral edge of the cover to hold the cover on a face cradle when wrapped thereabout.

In an exemplary embodiment, the cover is made of seamless cotton and has an elasticized edge along an outer peripheral edge and an inner peripheral edge defined by a narrow slit extending inward from the outer edge to an unelasticized wider medial opening.

BRIEF DESCRIPTION OF THE SEVERAL VIEWS OF THE DRAWINGS

The details of construction and operation of the invention are more fully described with reference to the accompanying drawings which form a part hereof and in which like reference numerals refer to like parts throughout.

In the drawings.

Figure 1:
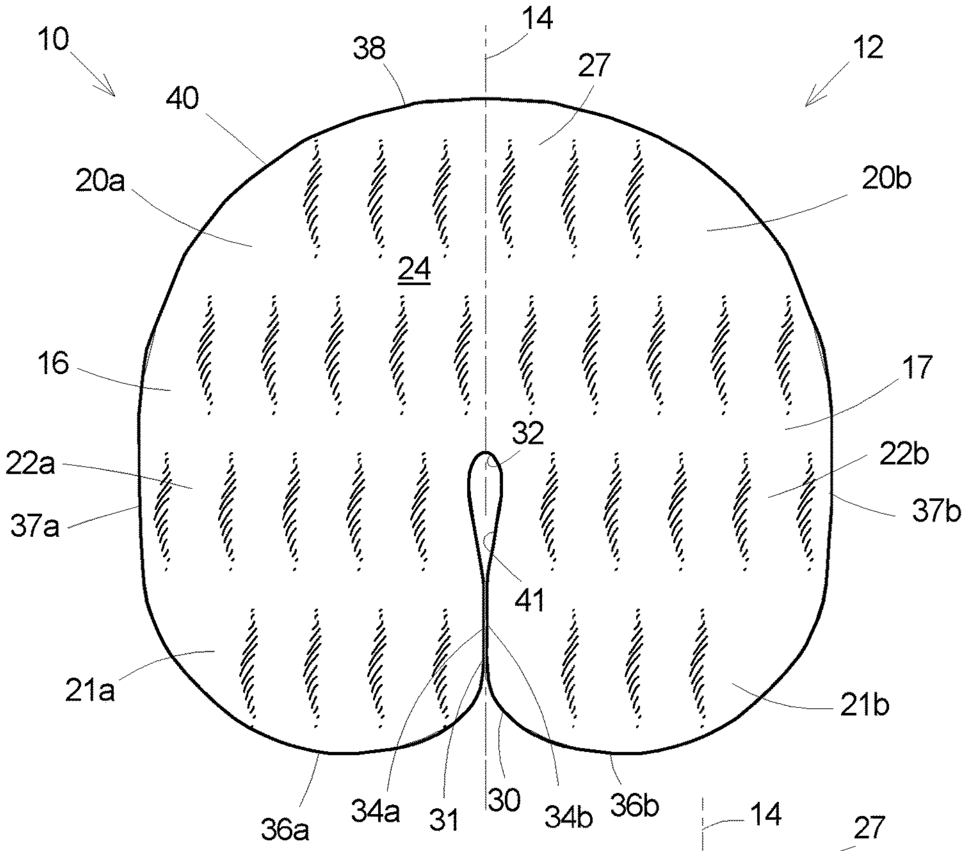
FIG. 1 is top plan view of a panel of material cut to form a face cradle cover.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood.

DETAILED DESCRIPTION OF THE PREFERRED EMBODIMENTS

While the present invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

Figure 5:
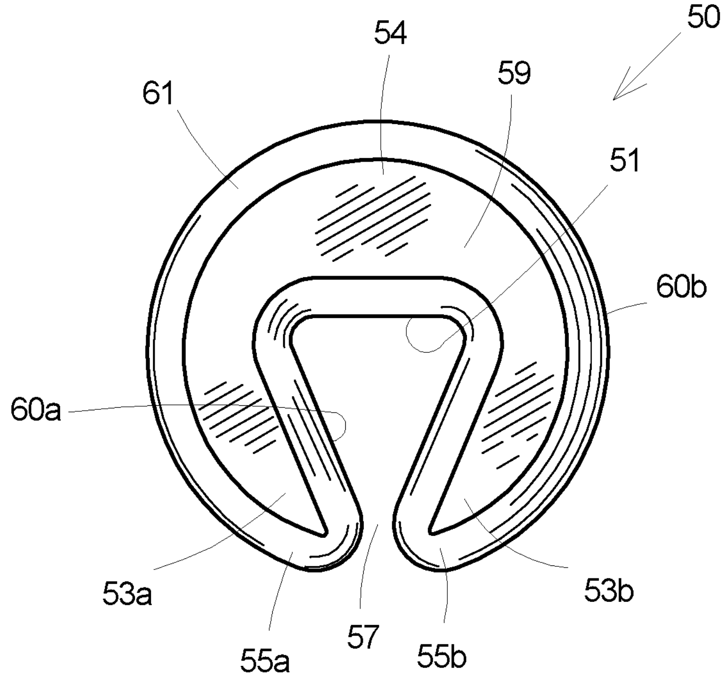
Fig. 5 PRIOR ART
FIG. 5 is a top plan view of a typical prior art face cradle without a cover; and, FIG. 6 is an isometric view of the prior art face cradle shown in FIG. 5.
Figure 6:
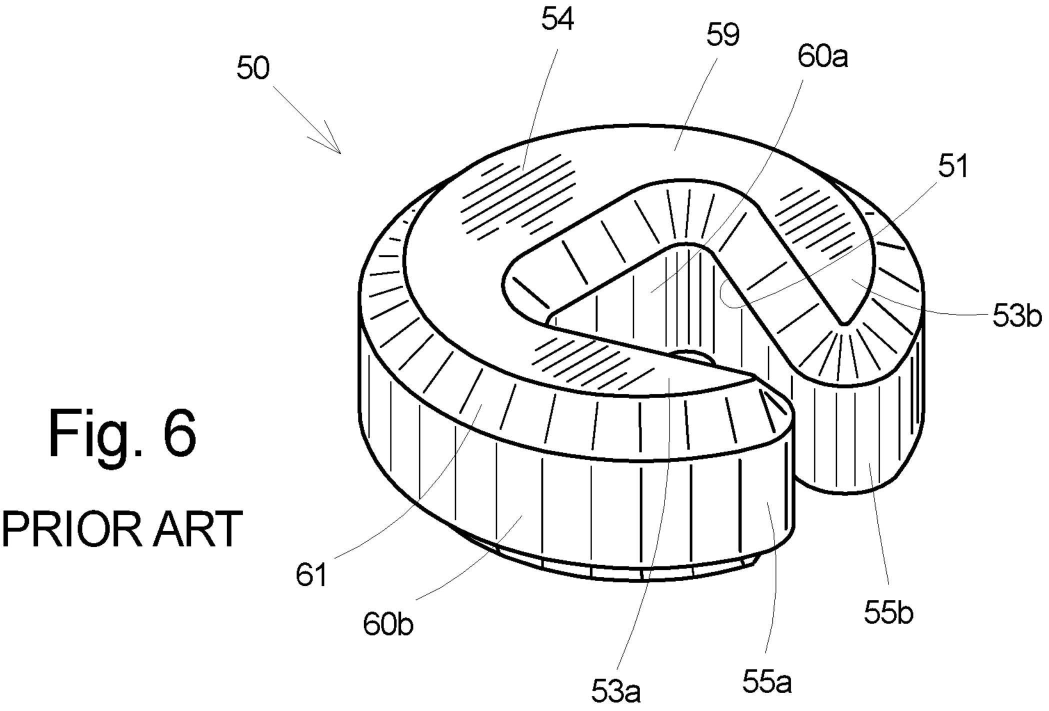
Fig. 6 PRIOR ART

FIGS. 5 and 6 show a typical uncovered padded face cradle 60 that is filled with foam or other suitable material and covered with leather, plastic or other suitable material. The face cradle 50 is usually resiliently compressible so that a user client may rest his face within the central opening 51. The face cradle 50 has a generally horseshoe-shaped or U-shaped configuration with a pair of legs 53*a*,53*b* extending divergingly from a head portion 54 and terminating in heel portions 55*a*,55*b* spaced on either side of a channel 57 lying on a bisecting centerline. The cradle 50 has a relatively flat top wall 59 and bottom wall (not shown) joined to inner and outer side walls 60*a*,60*b*, respectively, by a connecting slant wall 61.

The outward lateral edges of the opposed legs 53*a*,53*b* define the cradle's width and the distance from its head to its heels define its length. The distance between the top wall 59 and the bottom surface (not shown) defines the cradle's height or thickness. When the face cradle 50 is mounted at the end of a massage table (not shown), it is usually supported by a metal or wooden frame with its top wall 59 wrapped by a cover.

Figure 2:
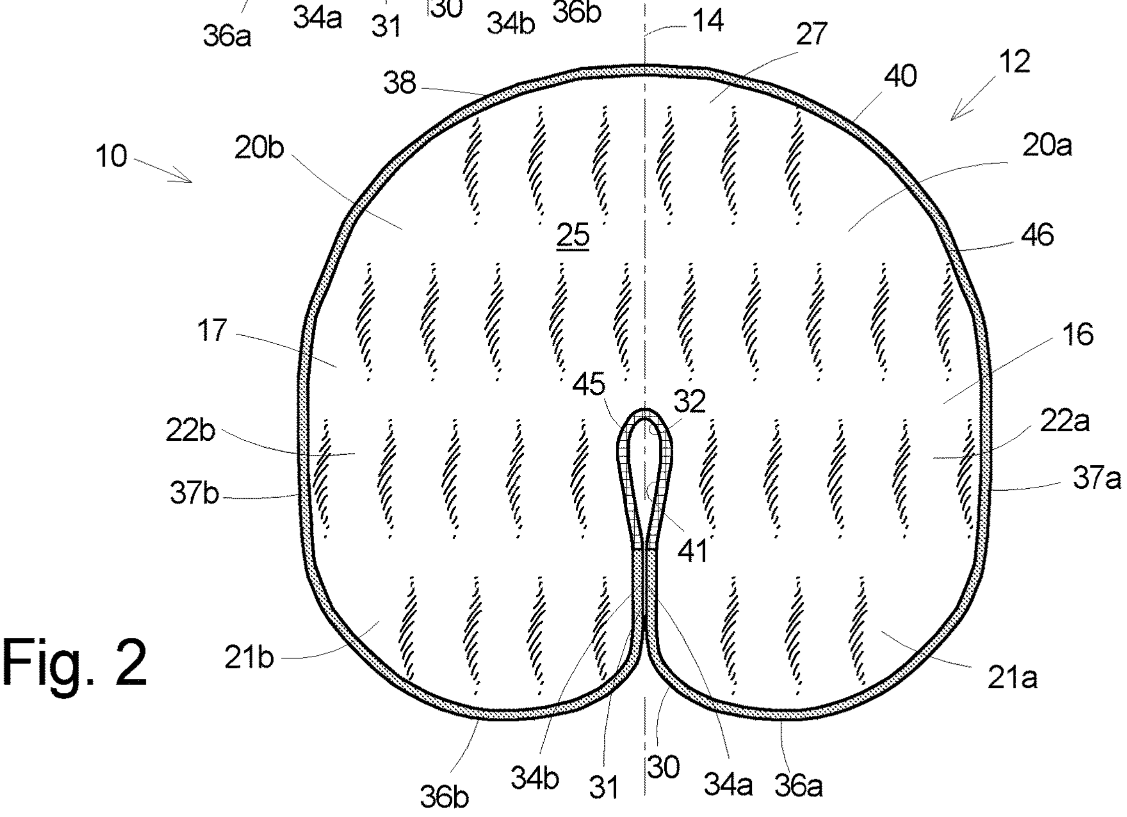
FIG. 2 is a bottom plan view of the panel of material shown in FIG. 1 showing a stretched elastic strip extending adjacent the external edge.

Referring to the remaining drawings in greater detail, and more particularly to FIGS. 1-4, a seamless face cradle cover, generally designated 10, having a longitudinal length and a lateral width is made from a flat cotton fabric sheet configured to form a generally circular panel, generally designated 12. The panel 12 is intended to be formed as a continuous unitary structure fabricated from a single piece of material. An imaginary longitudinal line 14 indicates that the panel 12 has two bilaterally-symmetric lobes 16 and 17, each respectively having a top portion 20*a*,20*b*, a bottom portion 21*a*,21*b*, and an intermediate portion 22*a*,22*b*. The panel 12 has an anterior front surface 24 as seen in FIG. 1 and a posterior back surface 25 as seen in FIG. 2.

The top portions 20*a*,20*b* form a uninterrupted seamless head portion 27 spanning the upper part of the panel 12. Between the bottom portions 21*a*,21*b* is a generally triangularly-shaped recess 30 and a narrow slit 31 aligned along the longitudinal line 14 that laterally separates the bottom portions 21*a*,21*b* of the panel 12. Between the intermediate portions 22*a*,22*b* is a medial teardrop-shaped opening 32 that laterally separates the intermediate portions 22*a*,22*b* of the panel 12 and has a closed arcuate upper end and an open narrowing lower end.

The narrow slit 31, which opens internally into the outer end of the medial opening 32, is defined by a pair of spaced, relatively-straight facing internal edges 34*a*,34*b* having inner ends joined with the respective sides of the opening 32 and outer ends joined with the respective sides of the recess 30. Arcuate heel edges 36*a*,36*b* of the panel 12 extend from outer end of the narrow slit 31 outward to intermediate edges 37*a*,37*b* of the panel 12. In turn, the intermediate edges 37*a*,37*b* extend to an arcuate head edge 38. As shown, the arcuate head edge 38 extends across the top and the triangularly-shaped recess 30 is at the bottom center. As so formed, the external peripheral edge, generally designated 40, of the panel 12 extends around the top of the panel 12 beginning at the inner end of the recess 30, while the internal peripheral edge 41 of the panel 12 extends inward from inner ends of the recess 30, i.e., the outer ends of the narrow slit 31.

To finish the cover 10, a soft stitch or a serge stitch 45 to prevent fraying is made along and around the edges of the opening 32. A thin elastic strip 46 is sewn onto the margin of the external edge 40 and the internal edges 34*a*,34*b* of the panel 12 and extends outward from the outer end of the opening 32 around the outer periphery of the panel 12. The elastic strip 46 may optionally be disposed within a folded-over edge or pocket formed along the panel's periphery. The elastic strip 46, which is approximately 8 mm wide, is stretched as it is affixed to the panel 12 so that when suitably attached it contracts and causes the edge to be gathered forming small pleats or ruffles.

Figure 3:
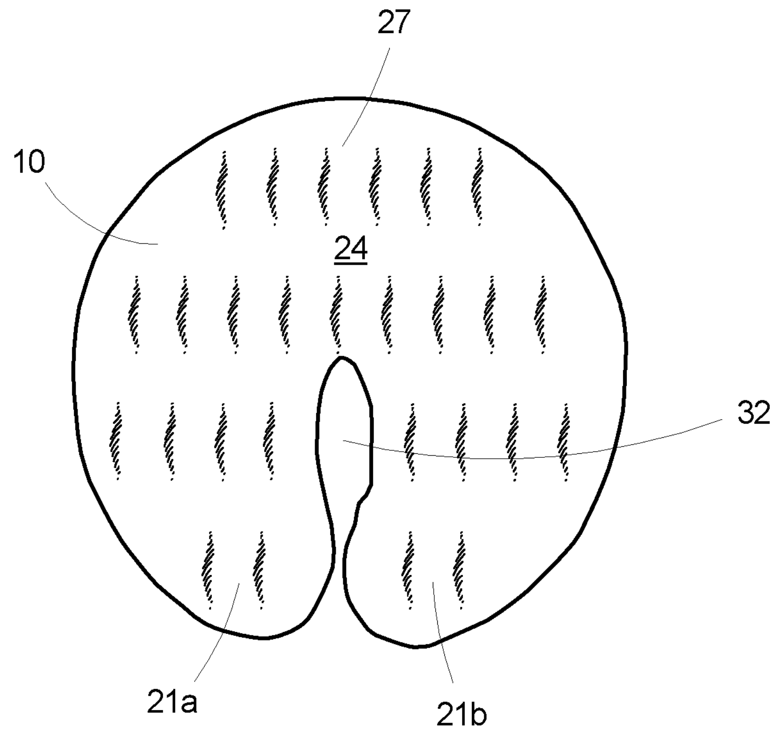
FIG. 3 is a top plan view showing the anterior surface of the cover wrapped around a face cradle and held in place by the contracted elastic strip.
Figure 4:
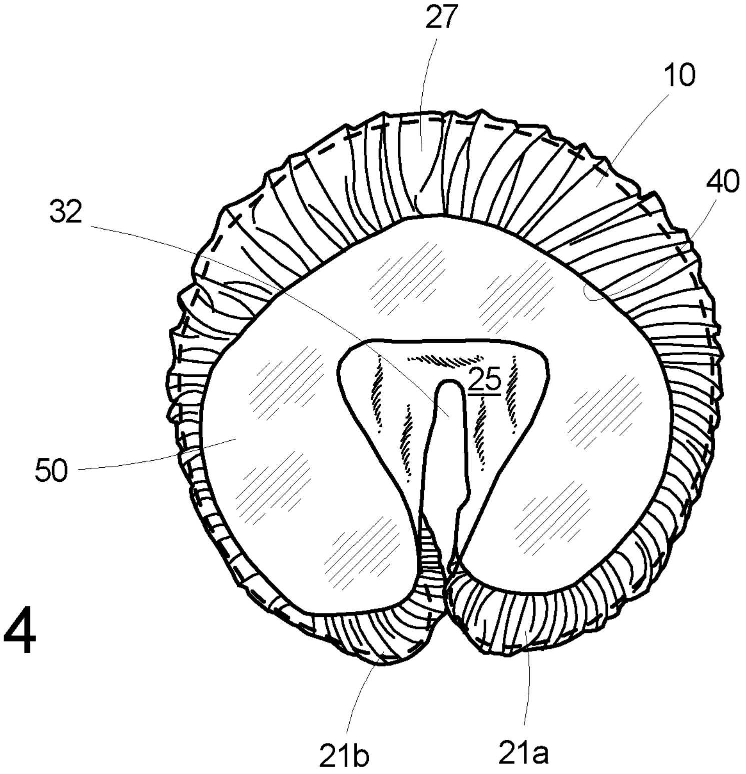
FIG. 4 is a bottom plan view showing the posterior surface of the cover wrapped around the face cradle.

As seen in FIGS. 3 and 4, when the finished cover 10 is placed over the cradle 50, the elasticized edges are pulled around the side walls of the cradle 50 so that the peripheral edges lie underneath the cradle 50 and hold the cover 10 on the cradle 50 with the narrow slit 31 and opening 32 overlying the cradle opening. The resilience of the elastic causes the cover 10 to be held on the cradle 50 and smooth out the wrinkles of the fabric.

The cover 10 has a width that is at least greater than the face cradle's width plus twice the face cradle's thickness and a length that is at least greater than the cradle's length plus twice the cradle's thickness so that when the cover 10 is placed onto the face cradle 50 it wraps around the top and sides of the face cradle 50 with the cover edges underlying the bottom of the face cradle 50 and the elastic strip 46 tensioning the cover 10 to hold it in place. In an exemplary embodiment, the cover 10 has an approximate length of 22 inches and a width of 22 inches, which is suitable for many available face cradles.

Industrial Applicability

It should be apparent the face cradle cover described herein is a simple, functional unit that is effective and easily manufactured.

Other aspects, objects and advantages of this invention can be obtained from a study of the drawings and the disclosure.

It should be understood that the terms "top," "bottom," "upper," "lower," "front," "back," "side," "end," "height," "width," "length," "thickness," "inner," "outer," "longitudinal," "lateral," and similar terms as used herein, have reference only to the structure shown in the drawings and are utilized only to facilitate describing the invention. The terms and expressions employed herein have been used as terms of description and not of limitation.

As used herein, the term "longitudinal" shall mean in the direction from top to bottom, i.e. head to heel; the term "lateral" shall mean in the direction across the longitudinal direction generally orthogonal to longitudinal; and, the term "within" shall mean "to be partially or completely inside of."

From the foregoing, it will be observed that numerous variations and modifications may be effected without departing from the spirit and scope of the invention. It is to be understood that no limitation with respect to the specific apparatus illustrated herein is intended or should be inferred. While specific embodiments of the invention have been disclosed, one of ordinary skill in the art will recognize that one can modify the materials, dimensions and particulars of the embodiments without straying from the inventive concept.

What is claimed is:

1. A face cradle cover for placement on a face cradle, the face cradle cover comprising:

a seamless sheet of fabric material having a pair of bilaterally-symmetric lobes;

each bilaterally-symmetric lobe having a top portion, a bottom portion, and an intermediate portion, the top portions forming an arcuate head portion spanning a top part of the seamless sheet, and the bottom portions forming a pair of arcuate heel edges separated by a triangularly-shaped recess with concave sides, the triangularly-shaped recess having an upper end and a lower end;

the seamless sheet having a teardrop-shaped opening intermediate the pair of bilaterally-symmetric lobes, the teardrop-shaped opening having an internal peripheral edge forming a closed arcuate upper end and an open narrowing lower end;

the seamless sheet having a narrow slit having facing internal peripheral edges, the narrow slit extending between the open narrowing lower end of the teardrop-shaped opening and the upper end of the triangularly-shaped recess;

the seamless sheet having an external peripheral edge extending from the narrow slit around the pair of arcuate heel edges and the arcuate head portion;

a soft stitch fixed to the seamless sheet, the soft stitch extending along the internal peripheral edge of the teardrop-shaped opening; and an elastic strip fixed to the seamless sheet, the elastic strip extending only along the facing internal peripheral edges of the narrow slit and external peripheral edge of the seamless sheet and not extending along the teardrop-shaped opening.

2. The face cradle cover of claim 1 wherein the teardrop-shaped opening is below the center of the face cradle cover.

3. The face cradle cover of claim 2 wherein the teardrop-shaped opening is laterally centered between the intermediate portions of the pair of bilaterally-symmetric lobes.

4. The face cradle cover of claim 1 wherein the concave sides of the triangularly-shaped recess are arcuate.

5. The face cradle cover of claim 1 wherein the seamless sheet of fabric material is made of cotton.

6. The face cradle cover of claim 1 wherein the elastic strip has a contracted length less than the distance around the face cradle.

* * * * *